(12) United States Patent
Short (10) Patent No.: US 9,764,390 B2
(45) Date of Patent: Sep. 19, 2017

(54) CLOSED-LOOP METALWORKING SYSTEM

(71) Applicant: Matthew A. Short, Wilmington, OH (US)

(72) Inventor: Matthew A. Short, Wilmington, OH (US)

(73) Assignee: Cumberland & Western Resources, LLC, Bowling Green, KY (US)

( * ) Notice: Subject to any disclaimer, the term of this patent is extended or adjusted under 35 U.S.C. 154(b) by 117 days.

(21) Appl. No.: 14/851,654

(22) Filed: Sep. 11, 2015

(65) Prior Publication Data

US 2017/0066061 A1 Mar. 9, 2017

Related U.S. Application Data

(63) Continuation-in-part of application No. 14/846,064, filed on Sep. 4, 2015.

(51) Int. Cl.
*G05B 13/02* (2006.01)
*B23B 37/00* (2006.01)
(Continued)

(52) U.S. Cl.
CPC .............. *B23B 37/00* (2013.01); *B23B 31/02* (2013.01); *B23B 31/083* (2013.01);
(Continued)

(58) Field of Classification Search
CPC ............ B23B 329/125; B23B 2270/38; A61B 17/320068; A61B 17/320092; B06B 1/0261; B06B 1/0207; B06B 1/0253; B06B 1/06; B06B 3/00; B23K 20/10; B29C 65/08; B29C 66/924; G05B 2219/45206; G05B 19/182; G05B 2219/40409;
(Continued)

(56) References Cited

U.S. PATENT DOCUMENTS 3,561,462 A * 2/1971 Jugler ...................... B06B 1/06
173/117
3,614,484 A * 10/1971 Shoh ........................ B24B 1/04
228/1.1
(Continued)

FOREIGN PATENT DOCUMENTS

WO 2013093845 A1 6/2013

OTHER PUBLICATIONS

Office Action, U.S. Appl. No. 13/046,099, Sep. 23, 2013.*
(Continued)

*Primary Examiner* — Darrin Dunn (57) ABSTRACT

A closed-loop machining system that includes a rotating spindle assembly having a body, a tool holder connected to the body, an ultrasonic machining module connected to the tool holder, and a power supply for powering the module; a processor for controlling the operation of the closed-loop machining system; a safety and compatibility bridge linking the ultrasonic machining module to the processor, wherein the safety and compatibility bridge further includes an electrical connection between the ultrasonic machining module and the processor; and at least one microprocessor located in or associated with the ultrasonic machining module for enabling and processing communication between the ultrasonic machining module and the processor.

33 Claims, 6 Drawing Sheets

(51) Int. Cl.
    *B23Q 11/10* (2006.01)
    *B23B 31/117* (2006.01)
    *B23B 31/02* (2006.01)
    *B23B 31/08* (2006.01)

(52) U.S. Cl.
    CPC ...... *B23B 31/1179* (2013.01); *B23Q 11/1023* (2013.01); *B23B 2240/28* (2013.01); *B23B 2250/12* (2013.01); *B23B 2250/16* (2013.01); *B23B 2260/108* (2013.01); *B23Q 2220/002* (2013.01)

(58) Field of Classification Search
    CPC  G05B 2219/49304; G05B 2219/50197; Y10S 408/70; Y10S 148/902; Y10S 29/046
    See application file for complete search history.

(56) References Cited

U.S. PATENT DOCUMENTS

| | | | | |
|---|---|---|---|---|
| 4,649,609 A * | 3/1987 | Allison | B23Q 9/0014 | 29/26 A |
| 5,140,773 A * | 8/1992 | Miwa | B23B 37/00 | 451/1 |
| 5,357,423 A * | 10/1994 | Weaver | B23K 20/10 | 228/1.1 |
| 5,842,149 A | 11/1998 | Harrell et al. | | |
| 6,289,736 B1 * | 9/2001 | Statnikov | B06B 1/0253 | 73/1.82 |
| 6,519,500 B1 * | 2/2003 | White | G05B 19/00 | 156/73.1 |
| 6,633,234 B2 * | 10/2003 | Wiener | A61B 17/320068 | 340/506 |
| 6,762,535 B2 * | 7/2004 | Take | B23B 37/00 | 310/323.08 |
| 7,027,893 B2 * | 4/2006 | Perry | B25J 9/161 | 318/561 |
| 7,137,185 B2 * | 11/2006 | Voss | B23B 31/1179 | 279/102 |
| 7,297,238 B2 * | 11/2007 | Nayar | B06B 3/00 | 181/142 |
| 7,431,779 B2 * | 10/2008 | Statnikov | B06B 1/0253 | 148/400 |
| 7,475,801 B2 * | 1/2009 | Johansen | B06B 1/0261 | 156/580.1 |
| 8,875,804 B2 * | 11/2014 | Puzio | B25B 21/02 | 173/2 |
| 9,283,045 B2 * | 3/2016 | Rhee | A61B 17/320092 | |
| 2001/0020808 A1 * | 9/2001 | Suzuki | B06B 3/00 | 310/323.12 |
| 2002/0019683 A1 * | 2/2002 | White | G05B 19/00 | 700/255 |
| 2002/0049427 A1 * | 4/2002 | Wiener | A61B 17/320068 | 606/1 |
| 2002/0057541 A1 * | 5/2002 | Donofrio | A61B 17/320068 | 361/45 |
| 2003/0079557 A1 * | 5/2003 | Tatum | G01F 1/662 | 73/866.5 |
| 2003/0226887 A1 * | 12/2003 | Komine | B23Q 3/15546 | 235/375 |
| 2004/0180769 A1 * | 9/2004 | Perry | B23Q 3/15546 | 483/1 |
| 2005/0021021 A1 * | 1/2005 | Foltz | A61B 18/14 | 606/35 |
| 2005/0065647 A1 * | 3/2005 | Perry | B25J 9/161 | 700/245 |
| 2007/0155349 A1 * | 7/2007 | Nelson | H02J 13/0013 | 455/128 |
| 2007/0163349 A1 * | 7/2007 | Johansen | B06B 1/0261 | 73/584 |
| 2008/0041604 A1 * | 2/2008 | Sauer | B23B 31/02 | 173/217 |
| 2008/0173145 A1 * | 7/2008 | Chen | B23Q 1/70 | 82/117 |
| 2009/0035087 A1 * | 2/2009 | Nakamoto | B23B 31/1179 | 409/165 |
| 2009/0198369 A1 * | 8/2009 | Xu | B26D 5/20 | 700/173 |
| 2009/0224703 A1 * | 9/2009 | Woods | B24B 23/028 | 318/17 |
| 2010/0125388 A1 * | 5/2010 | Nagatomo | B60W 50/0098 | 701/36 |
| 2010/0140326 A1 * | 6/2010 | Ebihara | B23K 20/106 | 228/111.5 |
| 2010/0154161 A1 * | 6/2010 | Takahashi | A47L 9/19 | 15/347 |
| 2011/0126685 A1 * | 6/2011 | Geiss | B26D 7/086 | 83/613 |
| 2011/0155407 A1 * | 6/2011 | Yang | B06B 1/0207 | 173/217 |
| 2011/0222975 A1 * | 9/2011 | Short | B23B 29/125 | 408/17 |
| 2011/0268516 A1 * | 11/2011 | Short | B23B 29/125 | 408/17 |
| 2012/0277928 A1 * | 11/2012 | Geschwill | G05B 19/042 | 700/295 |
| 2014/0088753 A1 * | 3/2014 | Lim | H02P 6/14 | 700/168 |
| 2015/0051728 A1 * | 2/2015 | Kim | G05B 19/4061 | 700/175 |
| 2015/0105874 A1 * | 4/2015 | Miyazaki | G05B 15/02 | 700/80 |
| 2015/0127137 A1 * | 5/2015 | Brandt | B23K 5/00 | 700/166 |
| 2015/0151447 A1 * | 6/2015 | Petersson | B25F 5/006 | 30/381 |
| 2015/0253757 A1 * | 9/2015 | Ikeda | G05B 19/402 | 700/114 |
| 2015/0265347 A1 * | 9/2015 | Yates | A61B 18/1206 | 606/50 |
| 2015/0265358 A1 * | 9/2015 | Bowling | A61B 34/32 | 700/261 |
| 2015/0300165 A1 * | 10/2015 | Marsolek | G06K 7/10425 | 299/39.4 |
| 2016/0124416 A1 * | 5/2016 | Besuchet | G05B 19/042 | 700/173 |
| 2016/0342151 A1 * | 11/2016 | Dey, IV | G05B 19/4155 | |
| 2017/0020613 A1 * | 1/2017 | Kang | A61B 17/1764 | |

OTHER PUBLICATIONS

International Search Report, Mail Date: Dec. 28, 2015; International Application No. PCT/US15/49676, filed Sep. 11, 2015.

* cited by examiner

CLOSED-LOOP METALWORKING SYSTEM

CROSS-REFERENCE TO RELATED APPLICATIONS

This patent application is a continuation-in-part of U.S. patent application Ser. No. 14/846,064 filed on Sep. 4, 2015 and entitled "High-Speed Rotary Electrical Connector for Use in Ultrasonically Assisted Machining", the disclosure of which is incorporated by reference herein in its entirety and made part of the present patent application for all purposes.

BACKGROUND OF THE INVENTION

The described invention relates generally to systems for machining metals and other materials and more specifically to a system for machining metals and other materials into which an ultrasonic machining module has been incorporated, wherein the ultrasonic machining module is compatible with a variety of existing machining systems, devices, and processes due to its vibration-isolating characteristics.

Machining, which is a collective term for drilling, milling, reaming, tapping, and turning, is an enabling technology that impacts virtually all aspects of manufacturing in the United States and elsewhere in the world. In a specific example, a milling machine is a machining tool used to machine solid materials. Milling machines are typically classified as either horizontal or vertical, which refers to the orientation of the main spindle. Both types range in size from small, bench-mounted devices to much larger machines suitable for industrial purposes. Unlike a drill press, which holds the workpiece stationary as the drill moves axially to penetrate the material, milling machines move the workpiece axially and radially against the rotating milling cutter, which cuts on its sides as well as its tip. Milling machines are used to perform a vast number of operations, from simple tasks (e.g., slot and keyway cutting, planing, drilling) to complex tasks (e.g., contouring, diesinking).

Cutting and drilling tools and accessories used with machining systems (including milling machines) are often referred to in the aggregate as "tooling". Milling machines often use CAT or HSK tooling. CAT tooling, sometimes called V-Flange tooling, is the oldest and probably most common type used in the United States. CAT tooling was invented by Caterpillar Inc. of Peoria, Ill., to standardize the tooling used on Caterpillar machinery. HSK tooling, sometimes called "hollow shank tooling", is much more common in Europe where it was invented than it is in the United States. The holding mechanism for HSK tooling is placed within the hollow body of the tool and, as spindle speed increases, it expands, gripping the tool more tightly with increasing spindle speed.

Improving the machinability of certain materials is of significant interest to manufacturers of military equipment and certain commercial hardware, as well as to the builders of machine tools. More specifically, very advanced materials such as armor plates and composites are notoriously difficult to machine with standard systems and methods. High-speed systems and ultra-hard machining tools are used for such material, but provide only a marginal increase in tool life and productivity. Significant improvements in the machinability of materials have been achieved by implementing advanced technologies such as laser, waterjet, and EDM cutting. However, these processes are high in capital cost, limited in application, and differ too much to be used in standard machine shops. Also, the application of these processes is limited to certain types of cuts in the materials on which they are typically used.

Ultrasonic-assisted machining was developed in the United States in the 1950's and was used for machining materials that were considered to be difficult to machine at the time. The more modern process of ultrasonic machining (UM) involves the application of high power ultrasonic vibrations to "traditional" machining processes (e.g., drilling, turning, milling) for improving overall performance in terms of faster drilling, effective drilling of hard materials, increased tool life, and increased accuracy. This is typically accomplished by using drill bits manufactured from high speed steel (HSS), carbide, cobalt, polycrystalline diamond composite, or other suitable materials affixed to a collet (e.g., shrink fit, compression, hydraulic, or mechanical) that is affixed to an ultrasonic (US) transmission line. In this context, UM is not the existing ultrasonic-based slurry drilling process (i.e., impact machining) used for cutting extremely hard materials such as glass, ceramics, quartz. Rather, this type of UM concerns methods for applying high power ultrasonics to drills, mills, reamers, taps, turning tools, and other tools that are used with modern machining systems.

Although the use of ultrasonics with modern machining systems provides significant and numerous benefits, there are certain technical challenges involved, not the least of which is the incorporation of ultrasonic energy into machining systems that were not originally designed to accommodate this type of energy output. Thus, there is an ongoing need for an ultrasonic machining module that is compatible with and that may be incorporated into existing machining systems without damaging or negatively impacting the performance of such systems.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first closed-loop machining system or metal-working system is provided. This system includes: a non-rotating retention assembly that further includes a rigid body, a tool support or post connected to the body, an ultrasonic machining module connected to the tool post, and a power supply for powering the module; a processor for controlling the operation of the closed-loop machining system; a safety and compatibility bridge linking the ultrasonic machining module to the processor, wherein the safety bridge further includes electrical connectivity between the ultrasonic machining module and the processor; and at least one microprocessor located in or associated with the ultrasonic machining module for enabling and processing communication between the ultrasonic machining module and the processor. The ultrasonic machining module further includes: a collet for retaining a machining tool; an ultrasonic transducer connected to the collet for generating acoustical vibrations; and a housing positioned around the ultrasonic transducer and connected to the tool post, wherein the housing further includes at least one vibration-isolating structure that isolates substantially all acoustical vibrations generated by the ultrasonic transducer when the module is in operation except axial vibrations transmitted to the machining tool, thereby preventing unwanted vibrations from traveling backward or upward into the machining system.

In accordance with another aspect of the present invention, a second closed-loop machining system or metalworking system is provided. This system includes a rotating spindle assembly that includes: a body, a tool holder connected to the body, an ultrasonic machining module connected to the tool holder, and a power supply for powering the module; a processor for controlling the operation of the closed-loop machining system; a safety and compatibility bridge linking the ultrasonic machining module to the processor, wherein the safety and compatibility bridge further includes electrical connectivity between the ultrasonic machining module and the processor; and at least one microprocessor located in or associated with the ultrasonic machining module for enabling and processing communication between the ultrasonic machining module and the processor. The ultrasonic machining module further includes: a collet for retaining a machining tool; an ultrasonic transducer connected to the collet for generating acoustical vibrations; and a housing positioned around the ultrasonic transducer and connected to the tool post, wherein the housing further includes at least one vibration-isolating structure that isolates substantially all acoustical vibrations generated by the ultrasonic transducer when the module is in operation except axial vibrations transmitted to the machining tool, thereby preventing unwanted vibrations from traveling backward or upward into the machining system.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
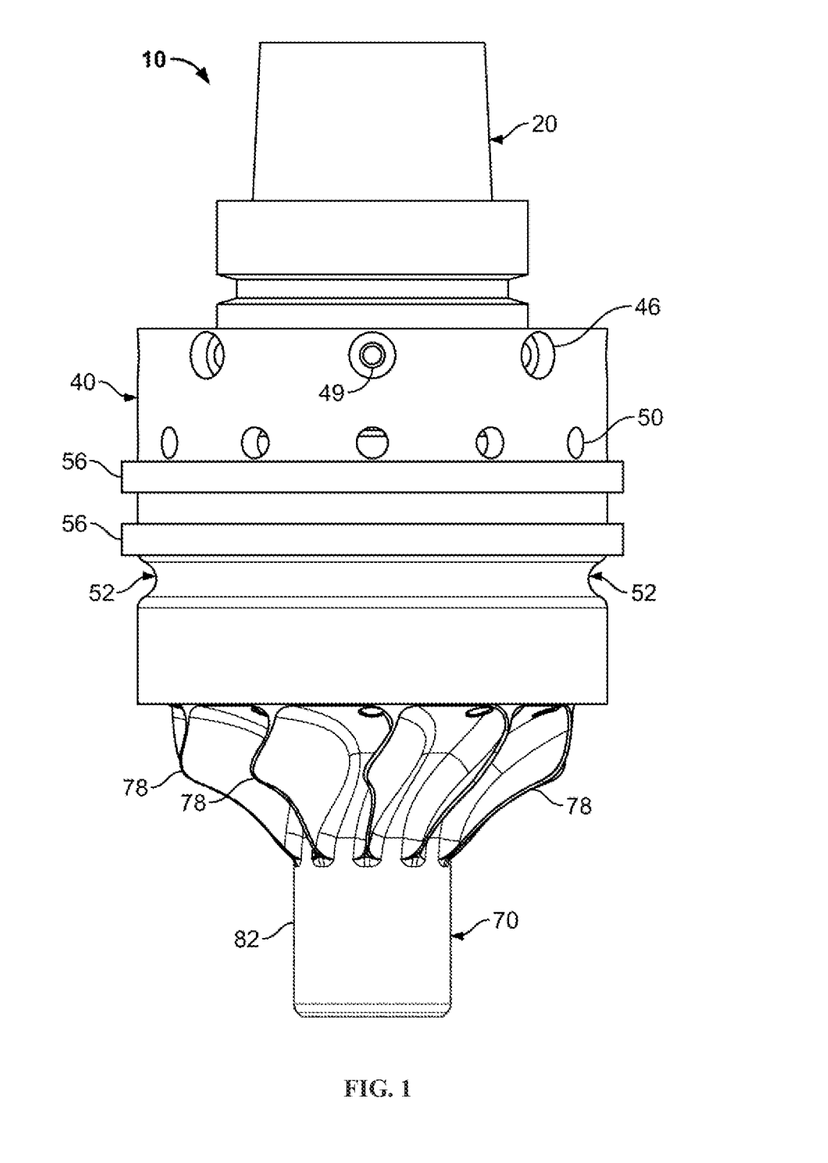
FIG. 1 is a side view of an ultrasonic machining module in accordance with an exemplary embodiment of the present invention.
Figure 2:
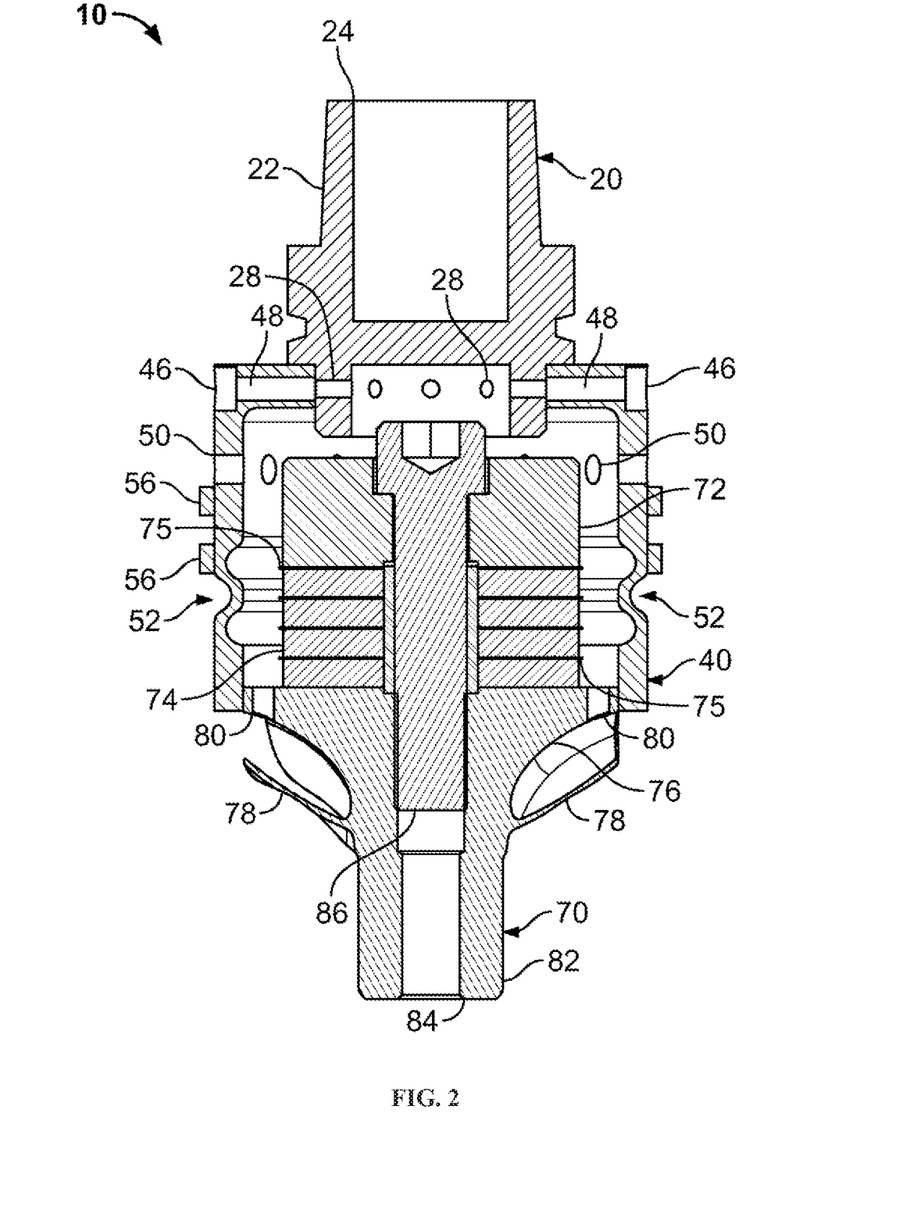
FIG. 2 is a cross-sectional view of the ultrasonic machining module of FIG. 1.

The present invention includes various ultrasonic machining modules that have been adapted for incorporation into existing commercially available machining systems that were not originally designed to accommodate such ultrasonic modules. With reference to FIGS. 1-2, a first exemplary embodiment of the present invention provides an ultrasonic machining module for use in a machining system, wherein the ultrasonic machining module includes: (a) an ultrasonic transducer, wherein the ultrasonic transducer is adapted to receive a machining tool, and wherein the ultrasonic transducer further comprises: (i) a front mass; (ii) a back mass; (iii) a plurality of piezoelectric ceramics positioned between the front mass and back mass; (iv) at least electrical contact (e.g., an electrode) sandwiched between the piezoelectric ceramics; and (v) a compressive member (e.g. a bolt) passing through the front mass, back mass, ceramics, and electrodes, wherein the compressive member is operative to apply compressive force to the ceramics; and (b) a vibration-isolating housing adapted to be both compatible with a machining system and to receive the ultrasonic transducer therein. The housing further includes a spring-like feature formed radially therein above the front mass, wherein the spring-like feature further includes a curved and thinned section of the housing, and wherein the curved and thinned section of the housing is operative to permit flexion in the housing for isolating all vibrations generated by the ultrasonic transducer when the device is in operation except axial vibrations transmitted to the machining tool, thereby preventing unwanted vibrations from traveling backward or upward into the machining system and potentially causing damage to the system or other problems. This particular embodiment is disclosed in U.S. patent application Ser. No. 13/046,099 (now U.S. Pat. No. 8,870,500), which is expressly incorporated by reference herein in its entirety, for all purposes.

With reference to FIGS. 1-2, an exemplary embodiment of ultrasonic machining module 10 includes three basic components: tool holder 20, housing 40, and ultrasonic transducer assembly 70. Tool holder 20 includes upper portion 22, which further includes primary bore 24 formed therein for attaching machining module 10 to the main spindle (e.g., CAT 40, 60 or HSK) of a machining system or center (not shown). Lower portion 26 of tool holder 20 includes a plurality of secondary bores 28 that cooperate with similar structures in housing 40 to mechanically couple tool holder 20 to housing 40 using connectors 49 (i.e., centering bolts). In some embodiments of the present invention, tool holder 20 is shrink-fit to housing 20 in addition to or instead of being bolted thereto.

Housing 40 includes a rigid cylindrical body 42 that further includes a centrally located aperture 44 that is adapted to receive tool holder 20, and a bottom opening 54, into which ultrasonic transducer assembly 70 is inserted. Circumferential electrical contacts 56 (i.e., slip rings) are positioned on the exterior of housing 40. As will be appreciated by one of ordinary skill in the art, the use of other types of electrical contacts is possible with this invention. For example, a single contact 56 may be utilized or the contacts may extend through the spindle of the machining system, while still providing or maintaining the flow of cooling air through the spindle. The top or upper portion of housing 40 includes a plurality of apertures 46 that connect to a plurality of bores 48 that correspond to the placement of bores 28 in tool holder 20 when machining module 10 is assembled. A series of connectors 49 are inserted into bores 48 and 28 for the purpose of bolting tool holder 20 to housing 40. A plurality of air outlets 50 is formed in housing 20. As described in greater detail below, air outlets 50 cooperate with specific structures on ultrasonic transducer assembly 70 to cool machining module 10 when in use, thereby reducing or eliminating the need for any separate or external system or apparatus for cooling piezoelectric ceramics 74.

Housing 40 also includes circumferential region 52, which acts as a vibration isolating spring, and as such is characterized as a "spring-like structure". In the exemplary embodiment, region 52 includes a contoured and thinned section of the material from which housing 40 is manufactured. When machining module 10 is in use, region 52 permits a degree of flexion in housing 40, thereby absorbing and/or isolating acoustic energy generated by ultrasonic transducer assembly 70 and preventing unwanted vibration from traveling backward or upward into the spindle or other mechanical components of the machining system. Axial vibration generated by ultrasonic transducer assembly 70 is not diminished by region 52; therefore, torque is still delivered to the machining tool or other item that is attached to front mass 76 and that is being used to machine a workpiece. Within the context of this invention, the term "machining tool" should be understood to mean drill bit or any other machining tool or item that is attached to front mass 76. Essentially, region 52 is operative to absorb and/or isolate most or all vibrational modes except the axial vibrations directed toward the workpiece.

Ultrasonic transducer assembly 70 includes back mass 72, front mass 76, and a plurality of piezoelectric ceramics 74 positioned between these two structures. A plurality of electrodes 75 are sandwiched between piezoelectric ceramics 74, and compressive member 86 passes through back mass 72, ceramics 74, electrodes 75 and a portion of front mass 76. When tightened, compressive member 86 is operative to apply compressive force to piezoelectric ceramics 74. Although not shown in the Figures, a series of electrical lead wires are typically attached to at least one of the electrodes 75. These wires exit the interior of housing 40 either through housing 40 or through tool holder 20 where they then connect to circumferential electrical contacts 56. Brush contacts or other types of electrical contacts may be used to provide electricity to machining module 10. Transducer assembly 70 typically operates at power levels ranging from 1 kW-5 kW and amplitudes ranging from 25 µm to 150 µm.

In the exemplary embodiment of ultrasonic machining module 10 shown in FIGS. 1-2, ultrasonic transducer assembly 70 further includes a plurality of cooling members, fins or vanes 78 that are located circumferentially around front mass 76 just beneath a plurality of air inlets 80 that are also formed in front mass 76. When ultrasonic machining module 10 rotates, vanes 78, which simulate a compressor wheel, are operative to draw air upward and through air inlets 80. Air then flows through the interior of housing 40 across ceramics 74 for cooling purposes, and exits housing 40 though air outlets 50. As shown in the Figures, the front or bottom area of front mass 76 includes a tapered collet 82 that further includes bore 84, which is adapted to receive a drill bit, milling tool, or other item. As will be appreciated by the skilled artisan, a drill bit or other item (not shown) may be attached to collet 82 using the process known as shrink-fitting. By heating the mass around bore 84 uniformly, it is possible to significantly expand the diameter of the bore. The shaft of a drill bit or other item is then inserted into the expanded bore. Upon cooling, the mass around the bore shrinks back to its original diameter and frictional forces create a highly effective joint. In an exemplary embodiment, the bottom edge of housing 40 is attached to the top portion of front mass 76 using a shrink-fit process for facilitating removal of case 40 for repairing ultrasonic machining module 10. As will be appreciated by one of ordinary skill in the art, other means of attaching tooling items to front mass 76 and/or attaching housing 40 to transducer assembly 70 are possible and are compatible with the present invention.

Some or all of the metal components of ultrasonic machining module 10 are typically manufactured from A2 tool steel. Alternately, D2, SS, 4140, and/or 350-M tool steel may be used. Regardless of the material used, front mass 76 and back mass 72 may both be manufactured from the same material as a means for reducing amplitude. In general terms, mixing of the mass of these components adjusts amplitude. In the exemplary embodiment shown in FIGS. 1-2, total module length is about 7.5 inches (19.1 cm). However, the present invention is scalable and miniaturized variants of ultrasonic machining module 10 are compatible with medical and surgical systems and devices, among other applications.

Figure 3:
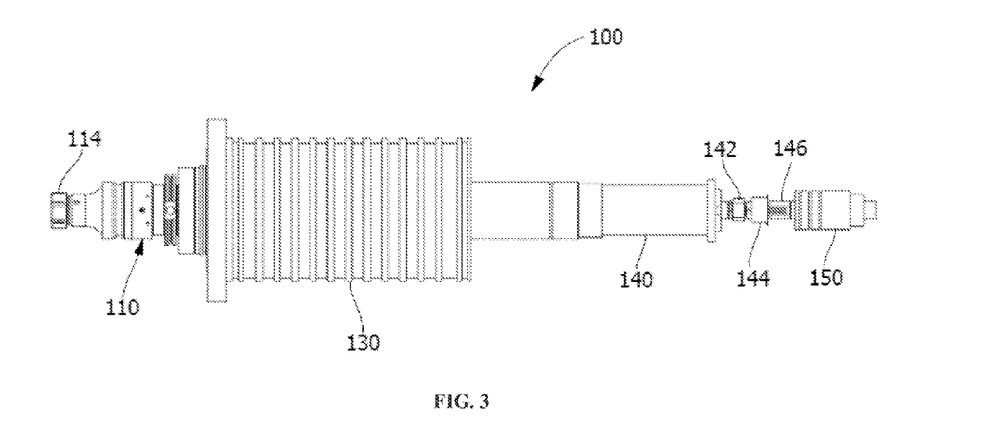
FIG. 3 is a side view of an ultrasonic machining module in accordance with an alternate embodiment of the present invention, wherein a high-speed rotary connector has been included on one end of a rotating spindle assembly that has been adapted to include a through spindle coolant system for delivering coolant fluid to a machining tool connected to the ultrasonic machining module.
Figure 4:
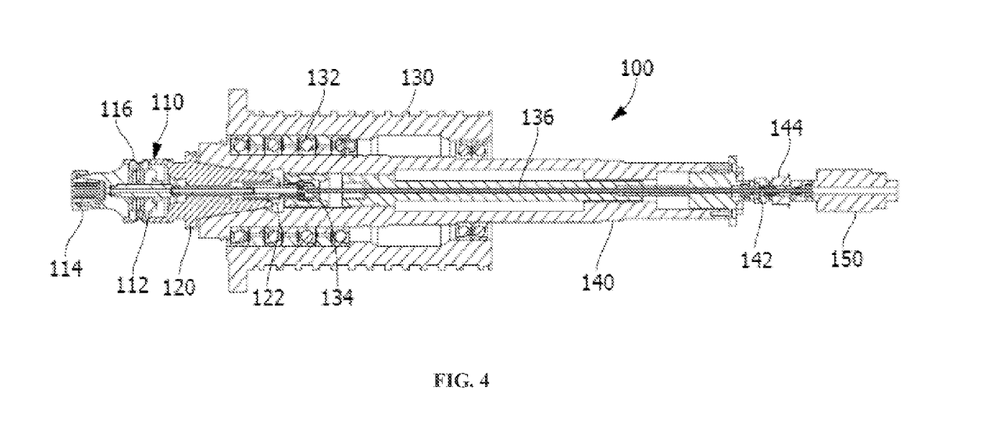
FIG. 4 is a cross-sectional side view of the ultrasonic machining module and rotating spindle assembly of FIG. 4.
Figure 5:
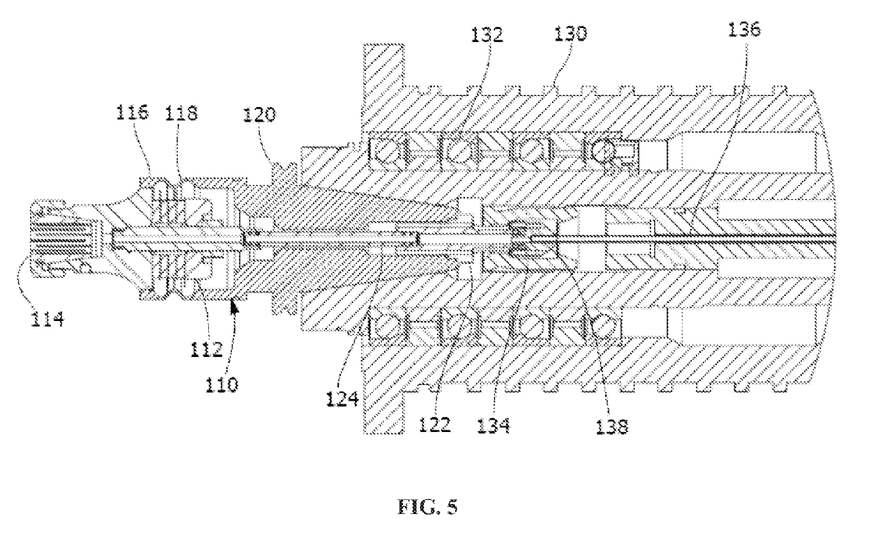
FIG. 5 is a cross-sectional side view of the ultrasonic machining module and rotating spindle assembly of FIG. 4 showing the portion of the rotating spindle assembly that includes the ultrasonic machining module.
Figure 6:
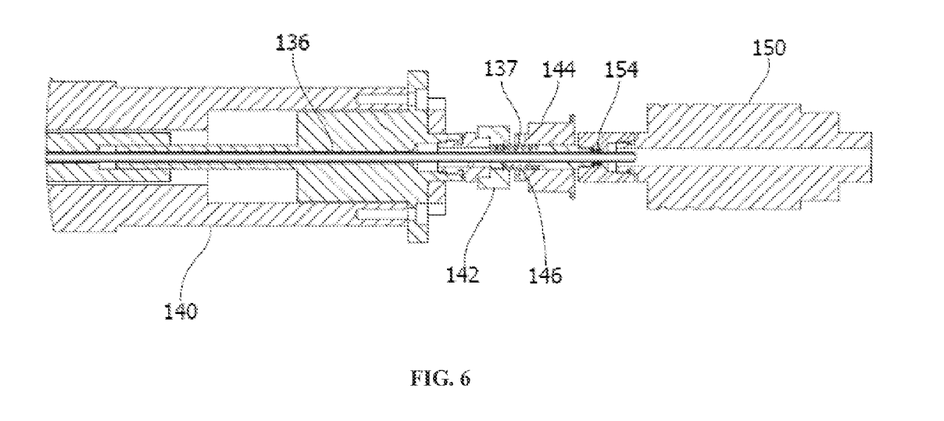
FIG. 6 is a cross-sectional side view of the ultrasonic machining module and rotating spindle assembly of FIG. 4 showing the portion of the rotating spindle assembly that includes the electrical rotary connector.

In addition to the features described above, some embodiments of the present invention also includes features that permit the introduction of the high-voltage signals that are used to operate high-power ultrasonic systems within a machining or metalworking environment. In the embodiment described below, this invention is capable of transmitting voltages over 400 VAC at power levels up to 10 kW through, for example, the use of a high-speed rotary electrical connector that is connected to an appropriate power supply (see FIG. 8). FIG. 3 provides a side view of an alternate embodiment of the present invention, wherein a high-speed rotary electrical connector has been included on one end of a rotating spindle assembly 100 that has been adapted to include a through-spindle coolant system for delivering coolant fluid to a machining tool (e.g., a drill bit) attached to ultrasonic machining module 110. In this embodiment, rotating spindle assembly 100 includes ultrasonic machining module 110, collet 114 (which is adapted to receive machining tools), bearing housing 130, drive shaft 140, coolant adapter 142, rotary slip ring 144, alignment ring 146, and coolant rotary union 150. FIG. 4 provides a detailed cross-sectional side view of rotating spindle assembly 100, wherein the following components are depicted in their relative positions within rotating spindle assembly 100: ultrasonic module 110, ultrasonic transducer 112, collet 114, housing 116, tool support or tool holder 120, retention knob 122, bearing housing 130, bearing 132, electrical connection 134, electrode shaft 136, drive shaft 140, coolant adapter 142, rotary slip ring 144, alignment ring 146, and coolant rotary union 150. FIG. 5 provides a cross-sectional side view of the portion of rotating spindle assembly 100 that includes ultrasonic machining module 110 and depicts the following additional structures: vibration dampening feature 118, transducer coolant coupler 124, electrical connection 134, electrode shaft 136, and coolant plug 138. FIG. 6 provides a cross-sectional side view of the portion of rotating spindle assembly 100 that includes coolant rotary union 150 and depicts the following additional structures: electrode path 137 and coolant electrode seal 154.

Figure 7:
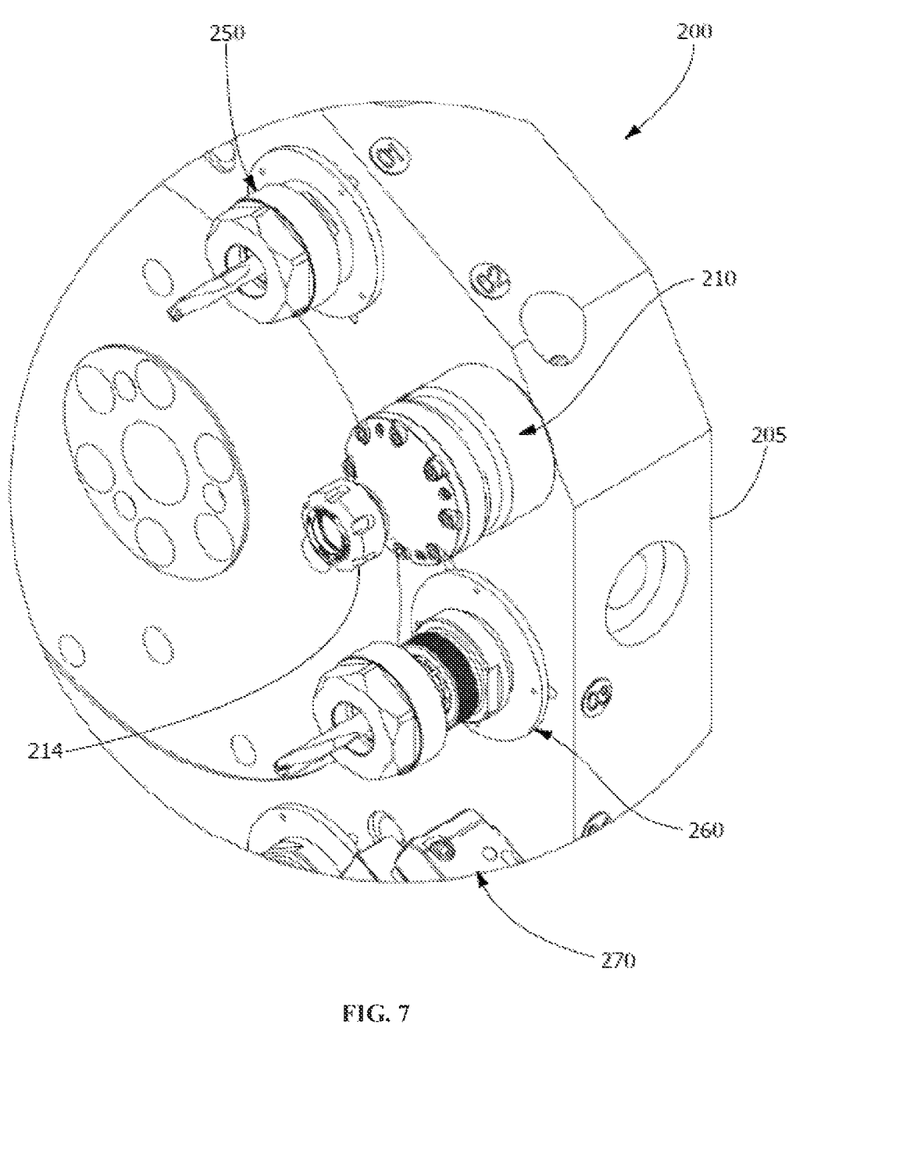
FIG. 7 is a partial perspective view of a non-rotating embodiment of the present invention, wherein the ultrasonic module is mounted on a rigid turret that includes other machining tools.

In the embodiment shown in FIGS. 3-6, electrical energy is delivered to ultrasonic transducer 112 using conductors that are located in a central lengthwise passage (electrode shaft 136) formed in rotating spindle assembly 100. These conductors run parallel through rotating spindle assembly 100 and make electrical contact with electrodes located within retention knob 122 (which also positions tool holder 120 within housing 116) at electrical connection 134, wherein electrical connection 134 is typically a two conductor pin connection. Electrical connection 134 also includes a plug and stem; wherein plug 138 makes the electrical connection and the stem protrudes into the body of retention knob 122 for sealing the electrical components from coolant fluid passing through fluid conduit 135. Electrode shaft 136 includes a stainless steel inner sleeve for withstanding high pressure situations that develop within rotating spindle assembly 100 during operations that include coolant fluid. For this connection to function with various tool changers, both positive and negative electrodes float in a manner that can be compressed with a plunger device during tool changing events. Electrical energy is delivered by high voltage rotary slip ring 144, which is mounted on rotating spindle assembly 100 on the end thereof that is opposite ultrasonic machining module 110. Rotary slip ring 144 exposes positive and negative electrode wiring through wiring passages 137, thereby permitting electrical connection to a processor main cable. Adjacent to rotary slip ring 144 is rotary union 150, which facilitates the use of conventional rotary connectors for passing coolant fluid (or air) through fluid conduit 135. FIG. 7 provides a partial perspective view of a non-rotating embodiment 200 of the present invention, wherein an ultrasonic machining module 210 (which is similar to ultrasonic machining module 110) is mounted on a rigid turret 205 that includes other machining tools 250, 260, and 270. In this embodiment, a non-rotating retention assembly replaces the rotating spindle assembly and a supportive tool post (not shown in the Figures) replaces tool holder 120. This embodiment may also include a through-transducer coolant pathway for delivering coolant fluid to the machining tool.

Figure 8:
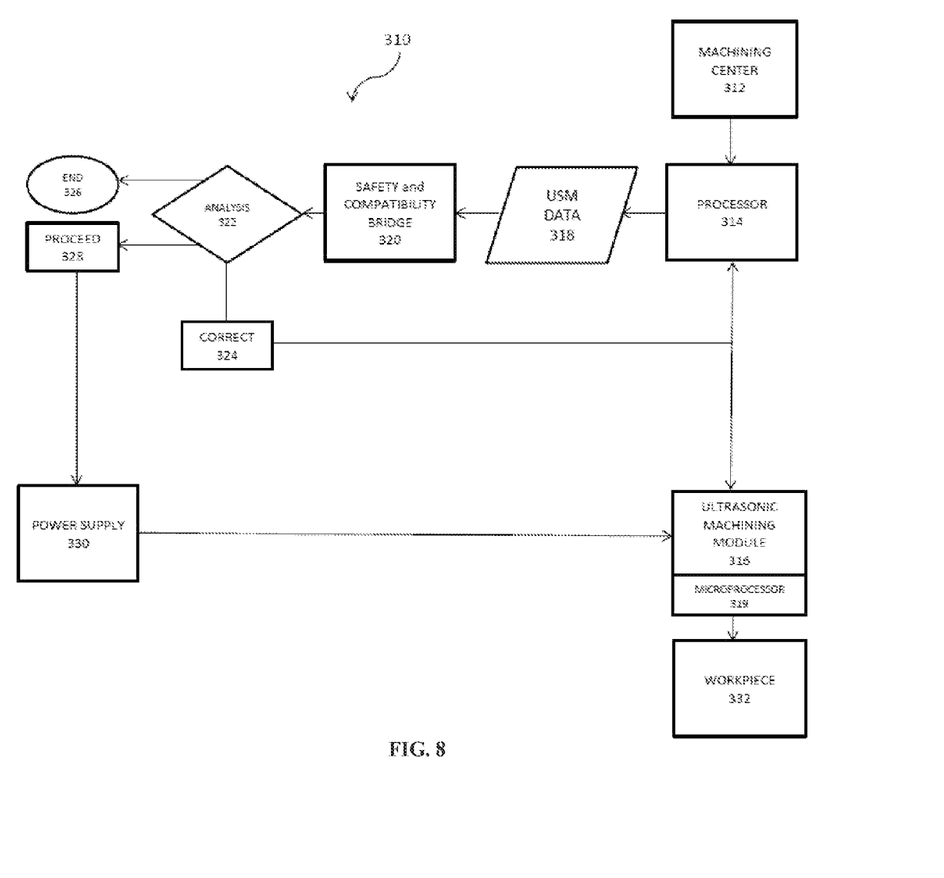
FIG. 8 is a generalized schematic/flowchart of a closed-loop machining system that includes an ultrasonic machining module in communication with a processor that utilizes a safety and compatibility bridge to selectively power the ultrasonic machining module based on certain predetermined operational parameters.

Due to the high power and high voltage aspects of the present invention, certain safety systems and features may be included to assure correct connectivity between system components and to be certain that any ultrasonic machining module (and any associated spindle or retention assembly) is connected to a power supply with which it is actually compatible. FIG. 8 provides a generalized schematic/flowchart of a closed-loop machining center or system 310 that includes an ultrasonic machining module 316 in communication with a processor 314 that utilizes a safety and compatibility bridge 320 to selectively power ultrasonic machining module 316 based on certain predetermined operational parameters. In this embodiment, machining center 312 is in communication with processor 314, which communicates with a microprocessor located in, on, or associated with ultrasonic machining module 316 for the purpose of verifying the presence of module 316 and for verifying other important aspects of ultrasonic machining module 316 with regard to compatibility with, and proper operation of, machining center 312. Processor 314 gathers data regarding ultrasonic machining module 316 at process step 318 and safety and compatibility bridge 320 analyzes this data at process step 322. Any necessary or required correction of the setup, communications, or operational parameters (or any other aspects of system 310) occurs at process step 324. If an unsafe, unacceptable or uncorrectable condition is detected during analysis 322, safety and compatibility bridge 320 prevents power supply 330 from providing power to ultrasonic machining module 316 (through any associated spindle or retention assembly) and machining center 312 will not operate. If no unsafe, unacceptable, or uncorrectable conditions are detected during analysis 322, safety and compatibility bridge 320 permits the powering of ultrasonic machining module 316 by power supply 330 at process step 328 and ultrasonic machining module 316 performs the desired operations on workpiece 332.

In an exemplary embodiment of the present invention, machining system 310 utilizes processor 314, which communicates (wirelessly or otherwise) with a microprocessor (e.g., an identification chip) 319 mounted on or in or otherwise associated with ultrasonic machining module 310. Among other operational aspects, microprocessor 319 communicates amplitude range of module 310 based on predetermined power settings for machining system 310. Microprocessor 319, which may be radio-frequency based in some embodiments, also communicates acceptable electrical connection conditions with power supply 330 and determines that no shorting events have occurred or are occurring. With regard to safety, it is important that the functional characteristics of ultrasonic machining module 310 be monitored at each predetermined power setting. Microprocessor 319 also communicates that an uninterrupted signal has been established with processor 314. Safety and compatibility bridge 320 confirms connection with an appropriate ultrasonic machining module 310 and will not allow power to be delivered to a spindle or retention assembly without an ultrasonic module connected to machining system 310. Additionally, safety and compatibility bridge 230 confirms that the ultrasonic module has been installed in the correct orientation, i.e., positive-to-positive and negative-to-negative. In embodiments that include through-spindle coolant capability, safety and compatibility bridge 320 also identifies coolant contamination that could lead to electrical energy being distributed through a machine tool into workpiece 332, and/or an operator of machining system 310.

Processor 314 provides numerous advanced features and includes software for providing microprocessor 319 with safety instructions based on predetermined operational parameters for ultrasonic machining module 310. Conventional practice in the field of ultrasonics typically utilizes a power supply that controls system operations. For example, a power supply auto tunes to a resonant frequency of a machining system and locks onto drive at a programmed amplitude setting. The machining process is typically controlled by monitoring time, power, distance, etc. This is usually accomplished with power supplies that have a frequency bandwidth of ±500 Hz and as much as ±1 kHz. The present invention eliminates such boundaries because processor 314 includes communication (typically wireless) with devices that are connected to main power supply 330 for identifying a correct ultrasonic machining module, ensuring safe operating conditions, and communicating to processor 314 within what amplitude domain the ultrasonic machining module should be operating. By way of example, processor 314 executes a frequency scan between 15 kHz and 25 kHz, and during this scan, processor 314 measures the impedance of the ultrasonic transducer within ultrasonic machining module 316 at varying frequencies to identify all resonant frequencies within that range. Processor 314 then establishes the longitudinal resonance of ultrasonic machining module 316 by monitoring system Q (i.e., reactive power/volt-ampere reactive), power at resonance, and capacitance. Once frequency tuning is completed, processor 314 communicates with machining center 312 to identify the RPM, feed rate, and tool diameter being used in a selected program. Processor 314 then uses a velocity algorithm to calculate the magnitude of machining velocity and calculates what the magnitude of velocity should be to correctly fit with predetermined machining parameters. This calculation results in an amplitude based on the resonant frequency established by processor 314 during the identification phase. Processor 314 also determines if a solid tool (i.e., drill bit) has been broken during machining operations. In the event of tool breakage, the impedance and frequency of ultrasonic machining module 310 will detect a sharp and sudden shift upon failure. In this event, a fault condition will arise and processor 314 will induce a soft stop condition on the machining tool followed with an error message.

In summary, the advantages and key functions provided by processor 314 include: (i) utilization of at least one algorithm to calculate at least one desired ultrasonic amplitude for ultrasonic machining module 316; (ii) providing fault status identification in the form of overloading, tool breakage, or a combination thereof; (iii) providing auto-tuning capability for identifying at least one desired resonant mode for ultrasonic machining module 316; and (iv) communication with microprocessor 319 to disable ultrasonic machining module 316 and place system 310 in a soft-stop condition, when necessary. The advantages and key functions provided by safety and compatibility bridge 320 include: (i) enabling communication between processor 314 and ultrasonic machining module 316 for purposes of identifying the ultrasonic machining module connected to machining center 312 and verifying its compatibility therewith; (ii) enabling communication between processor 314 and ultrasonic machining module 316 for confirming correct electrical contact, short circuit monitoring, or a combination thereof; (iii) enabling monitoring of the electrical connections for proper polarity; (iv) enabling monitoring of system 310 for the presence or absence of an ultrasonic machining module; (v) enabling monitoring of system 310 for a short-circuit condition caused by foreign object debris, electrical contaminants, or a combination thereof; and (vi) disabling the delivery of electrical power if an ultrasonic machining module is not connected to machining center 312.

While the present invention has been illustrated by the description of exemplary embodiments thereof, and while the embodiments have been described in certain detail, it is not the intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:
1. A closed-loop machining system, comprising:
(a) a retention assembly, wherein the retention assembly further includes:
    (i) a rigid body;
    (ii) a tool support connected to the rigid body;
    (iii) an ultrasonic machining module connected to the tool support, wherein the ultrasonic machining module further includes:
        a) a collet for retaining a machining tool;
        b) an ultrasonic transducer connected to the collet for generating acoustical vibrations; and
        c) a housing positioned around the ultrasonic transducer and connected to the tool support, wherein the housing further includes at least one vibration-isolating structure that isolates substantially all acoustical vibrations generated by the ultrasonic transducer when the module is in operation except axial vibrations transmitted to the machining tool, thereby preventing unwanted vibrations from traveling backward or upward into the machining system, wherein the vibration-isolating structure further includes a spring-like feature formed radially within the housing, wherein the spring-like feature further includes a curved and thinned section formed radially in the housing, and wherein the curved and thinned section permits flexion in the housing; and
    (iv) a power supply for powering the ultrasonic transducer; and
(b) a processor for controlling the operation of the closed-loop machining system;
(c) a safety and compatibility bridge linking the ultrasonic machining module to the processor, wherein the safety and compatibility bridge further includes electrical connectivity between the ultrasonic machining module and the processor; and
(d) at least one microprocessor located in or associated with the ultrasonic machining module for enabling and processing communication between the ultrasonic machining module and the processor.

2. The system of claim 1, further comprising software for providing the microprocessor with safety instructions based on predetermined operational parameters.

3. The system of claim 1, wherein the retention assembly is a non-rotating assembly, and wherein the non-rotating assembly further includes a through-transducer coolant pathway.

4. The system of claim 1, wherein the processor utilizes an algorithm to calculate at least one desired ultrasonic amplitude for the ultrasonic machining module.

5. The system of claim 1, wherein the processor provides fault status identification in the form of overloading, tool breakage, or a combination thereof.

6. The system of claim 1, wherein the processor includes auto-tuning capability for identifying at least one desired resonant mode for the ultrasonic machining module.

7. The system of claim 1, wherein the processor communicates with the microprocessor to disable the ultrasonic machining module and place the system in a soft-stop condition.

8. The system of claim 1, wherein the safety and compatibility bridge enables communication between the processor and the ultrasonic machining module for purposes of properly identifying the ultrasonic machining module.

9. The system of claim 1, wherein the safety and compatibility bridge enables communication between the processor and ultrasonic machining module for confirming correct electrical contact, short circuit monitoring, or a combination thereof.

10. The system of claim 1, wherein the safety and compatibility bridge enables monitoring of the electrical connection for proper polarity.

11. The system of claim 1, wherein the safety and compatibility bridge enables monitoring of the system for the presence of an ultrasonic machining module.

12. The system of claim 1, wherein the safety and compatibility bridge enables monitoring of the system for a short-circuit condition caused by foreign object debris, electrical contaminants, or a combination thereof.

13. The system of claim 1, wherein the safety and compatibility bridge disables the delivery of electrical power across the electrical connection if an ultrasonic machining module is not connected to the retention assembly.

14. The system of claim 1, wherein the microprocessor further includes an identification tag specific to the ultrasonic machining module.

15. The system of claim 14, wherein the identification tag is radio-frequency based.

16. The system of claim 1, wherein communication between the ultrasonic machining module and the processor is either wireless communication or wired communication.

17. A closed-loop machining system, comprising:
(a) a spindle assembly, wherein the spindle assembly further includes:
  (i) a body;
  (ii) a tool holder connected to the body; and
  (iii) an ultrasonic machining module connected to the tool holder, wherein the ultrasonic machining module further includes:
    a) a collet for retaining a machining tool;
    b) an ultrasonic transducer connected to the collet for generating acoustical vibrations;
    c) a housing positioned around the ultrasonic transducer and connected to the tool holder, wherein the housing further includes at least one vibration-isolating structure that isolates substantially all acoustical vibrations generated by the ultrasonic transducer when the module is in operation except axial vibrations transmitted to the machining tool, thereby preventing unwanted vibrations from traveling backward or upward into the machining system, wherein the vibration-isolating structure further includes a spring-like feature formed radially within the housing, wherein the spring-like feature further includes a curved and thinned section formed radially in the housing, and wherein the curved and thinned section permits flexion in the housing; and
  (iv) a power supply for powering the ultrasonic transducer; and
(b) a processor for controlling the operation of the closed-loop machining system;
(c) a safety and compatibility bridge linking the ultrasonic machining module to the processor, wherein the safety bridge further includes electrical connectivity between the ultrasonic machining module and the processor; and
(d) at least one microprocessor located in or associated with the ultrasonic machining module for enabling and processing communication between the ultrasonic machining module and the processor.

18. The system of claim 17, further comprising software for providing the microprocessor with safety instructions based on predetermined operational parameters.

19. The system of claim 17, further comprising a coolant pathway through the spindle assembly.

20. The system of claim 17, wherein the spindle assembly is a rotating assembly.

21. The system of claim 17, wherein the processor utilizes an algorithm to calculate at least one desired ultrasonic amplitude for the ultrasonic machining module.

22. The system of claim 17, wherein the processor provides fault status identification in the form of overloading, tool breakage, or a combination thereof.

23. The system of claim 17, wherein the processor includes auto-tuning capability for identifying at least one desired resonant mode for the ultrasonic machining module.

24. The system of claim 17, wherein the processor communicates with the microprocessor to disable the ultrasonic machining module and place the system in a soft-stop condition.

25. The system of claim 17, wherein the safety and compatibility bridge enables communication between the processor and ultrasonic machining module for purposes of properly identifying the ultrasonic machining module.

26. The system of claim 17, wherein the safety and compatibility bridge enables communication between the processor and the ultrasonic machining module for confirming correct electrical contact, short circuit monitoring, or a combination thereof.

27. The system of claim 17, wherein the safety and compatibility bridge enables monitoring of the electrical connection for proper polarity.

28. The system of claim 17, wherein the safety and compatibility bridge enables monitoring of the system for the presence of an ultrasonic machining module.

29. The system of claim 17, wherein the safety and compatibility bridge enables monitoring of the system for a short-circuit condition caused by foreign object debris, electrical contaminants, or a combination thereof.

30. The system of claim 17, wherein the safety and compatibility bridge disables the delivery of electrical power across the electrical connection if an ultrasonic machining module is not connected to the spindle assembly.

31. The system of claim 17, wherein the microprocessor further includes an identification tag specific to the ultrasonic machining module.

32. The system of claim 31, wherein the identification tag is radio-frequency based.

33. The system of claim 17, wherein communication between the ultrasonic machining module and the processor is either wireless communication or wired communication.

* * * * *